United States Patent
Suzuki et al.

(10) Patent No.: US 11,180,014 B2
(45) Date of Patent: Nov. 23, 2021

(54) VEHICLE HAVING IMPROVED TRANSMISSION OF TORQUE AND SUPPRESSION OF ROTATION OF DRIVING DEVICE UNIT

(71) Applicant: HONDA MOTOR CO., LTD., Tokyo (JP)

(72) Inventors: Takanori Suzuki, Saitama (JP); Takuro Tominaga, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 144 days.

(21) Appl. No.: 16/564,455

(22) Filed: Sep. 9, 2019

(65) Prior Publication Data

US 2020/0079201 A1    Mar. 12, 2020

(30) Foreign Application Priority Data

Sep. 12, 2018  (JP) .............................. JP2018-170798

(51) Int. Cl.
*B60K 1/04* (2019.01)
*H02K 7/00* (2006.01)

(52) U.S. Cl.
CPC ............... *B60K 1/04* (2013.01); *H02K 7/006* (2013.01); *B60K 2001/0416* (2013.01)

(58) Field of Classification Search
CPC .... B60K 1/04; B60K 1/00; B60K 2001/0438; B60K 2001/0405; B60K 2001/001;
(Continued)

(56) References Cited

U.S. PATENT DOCUMENTS

| 4,365,681 A * | 12/1982 | Singh .................. H01M 50/20 180/68.5 |
| 8,522,909 B2 * | 9/2013 | Niina ...................... B60K 1/00 180/299 |

(Continued)

FOREIGN PATENT DOCUMENTS

| EP | 2602140 A1 | 6/2013 |
| JP | H07-215070 A | 8/1995 |

(Continued)

OTHER PUBLICATIONS

Mar. 3, 2020, Japanese Office Action issued for related JP Application No. 2018-170798.

(Continued)

*Primary Examiner* — Steve Clemmons
(74) *Attorney, Agent, or Firm* — Paratus Law Group, PLLC

(57) ABSTRACT

A vehicle includes: a battery provided below a vehicle interior with a floor panel therebetween; and a driving device unit supported by a vehicle frame member via a front portion and a rear portion. A center of gravity of the battery is positioned forward compared to a rear wheel axle that connects the left rear wheel with the right rear wheel, a center of gravity of the driving device unit is positioned rearward compared to the rear wheel axle, the front portion is positioned forward compared to the rear wheel axle, the rear portion is positioned rearward compared to the rear wheel axle, the front portion is positioned above the rear portion, and a first imaginary line and a second imaginary line pass above the rear wheel axle and below wheel upper end portions of the left rear wheel and the right rear wheel in a side view.

13 Claims, 6 Drawing Sheets

(58) Field of Classification Search
CPC .................. B60K 7/006; B60K 7/0007; B60K 2007/0061; B60L 50/66
See application file for complete search history.

(56) References Cited

U.S. PATENT DOCUMENTS

| | | | | |
|---|---|---|---|---|
| 8,939,242 B2* | 1/2015 | Kurakawa | ............ | H01M 50/20 180/65.1 |
| 10,173,464 B2* | 1/2019 | Or-Bach | ................. | B60B 19/00 |
| 2003/0038468 A1* | 2/2003 | Chernoff | ................. | B60T 1/065 280/781 |
| 2007/0051549 A1* | 3/2007 | Fukuda | ................... | B60L 50/66 180/232 |
| 2011/0079454 A1* | 4/2011 | Maguire | ................. | B60K 6/52 180/65.25 |
| 2011/0094807 A1* | 4/2011 | Pruitt | ..................... | B60K 17/36 180/65.6 |
| 2011/0259657 A1* | 10/2011 | Fuechtner | ............ | B60K 7/0007 180/65.21 |
| 2012/0103708 A1* | 5/2012 | Hennings | ............. | B60K 7/0007 180/65.6 |
| 2012/0161472 A1* | 6/2012 | Rawlinson | .............. | B60R 16/04 296/187.08 |
| 2012/0169089 A1* | 7/2012 | Rawlinson | .............. | B60L 53/80 296/193.08 |
| 2013/0112491 A1 | 5/2013 | Suzuki et al. | | |
| 2014/0193683 A1* | 7/2014 | Mardall | ............. | H01M 10/625 429/99 |
| 2017/0001667 A1* | 1/2017 | Ashraf | ...................... | B60K 1/00 |
| 2017/0305250 A1* | 10/2017 | Hara | ........................ | B60K 1/04 |
| 2018/0108891 A1* | 4/2018 | Fees | ......................... | B60K 1/04 |
| 2018/0261899 A1* | 9/2018 | Milton | .............. | H01M 10/6567 |
| 2019/0061820 A1* | 2/2019 | Kauert | ................. | B62D 29/008 |
| 2019/0275875 A1* | 9/2019 | Fukui | ..................... | B62D 25/20 |
| 2019/0283561 A1* | 9/2019 | Battaglia | .............. | B62D 21/155 |
| 2020/0180589 A1* | 6/2020 | Or-Bach | ................. | B62D 61/00 |
| 2020/0247226 A1* | 8/2020 | Meyer | ..................... | B60K 1/00 |

FOREIGN PATENT DOCUMENTS

| | | |
|---|---|---|
| JP | 2001-097048 A | 4/2001 |
| JP | 2012-076506 A | 4/2012 |
| JP | 2013-082250 A | 5/2013 |
| WO | WO 2012/017935 A1 | 2/2012 |

OTHER PUBLICATIONS

Feb. 5, 2020, European Search Report issued for related EP Application No. 19196319.8.

\* cited by examiner

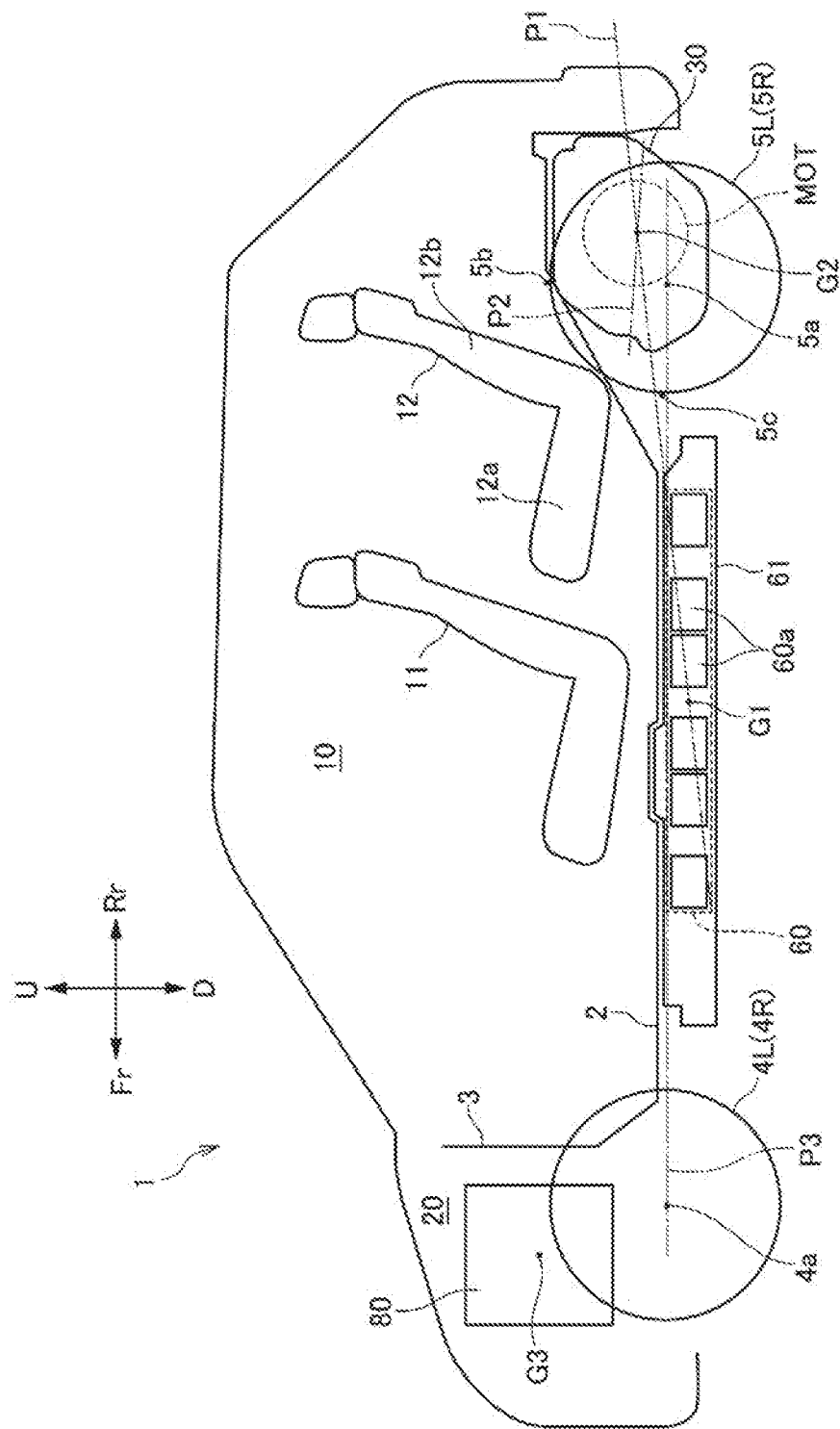
[FIG. 1]

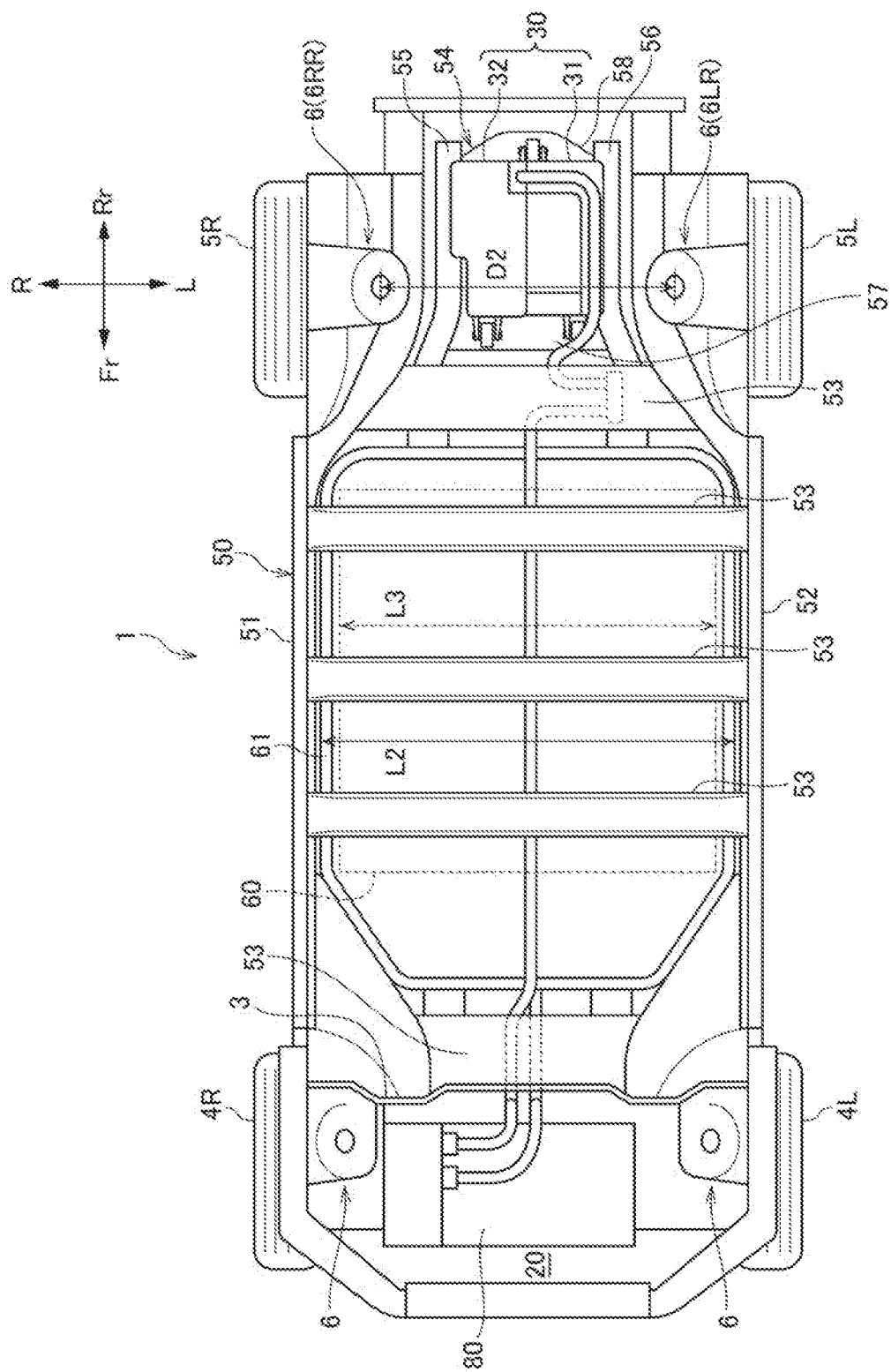
[FIG. 2]

[FIG. 3]
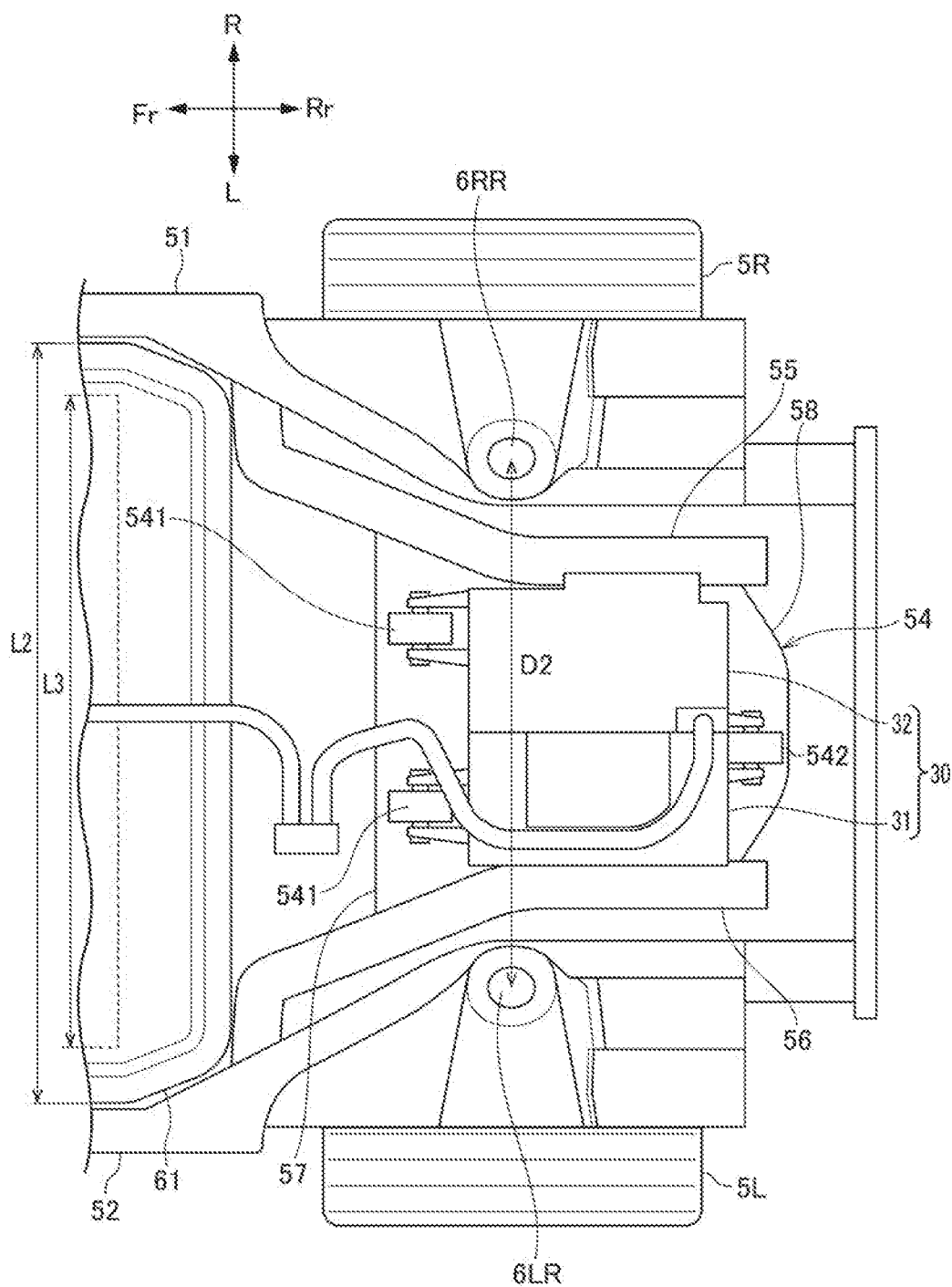

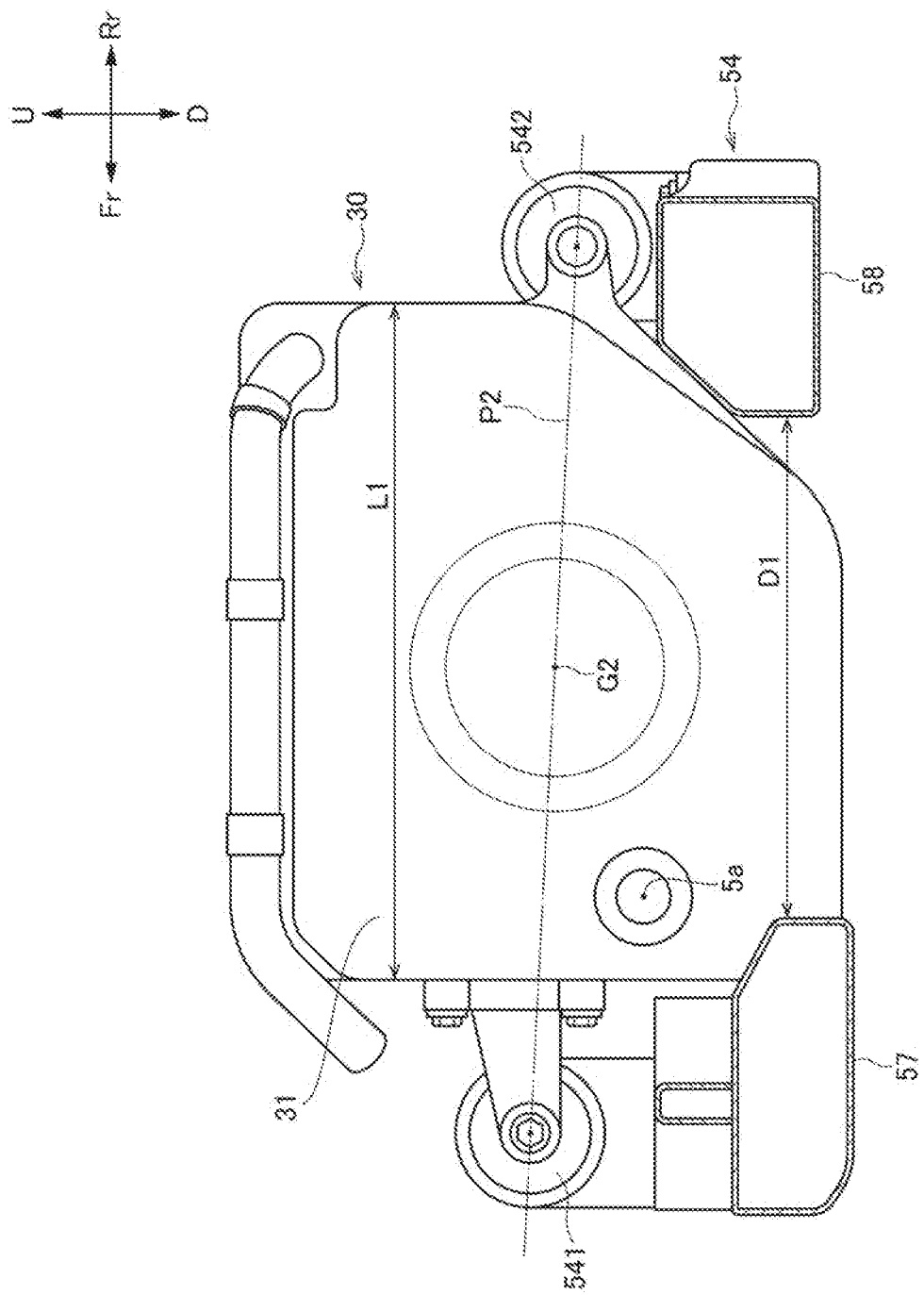
[FIG. 4]

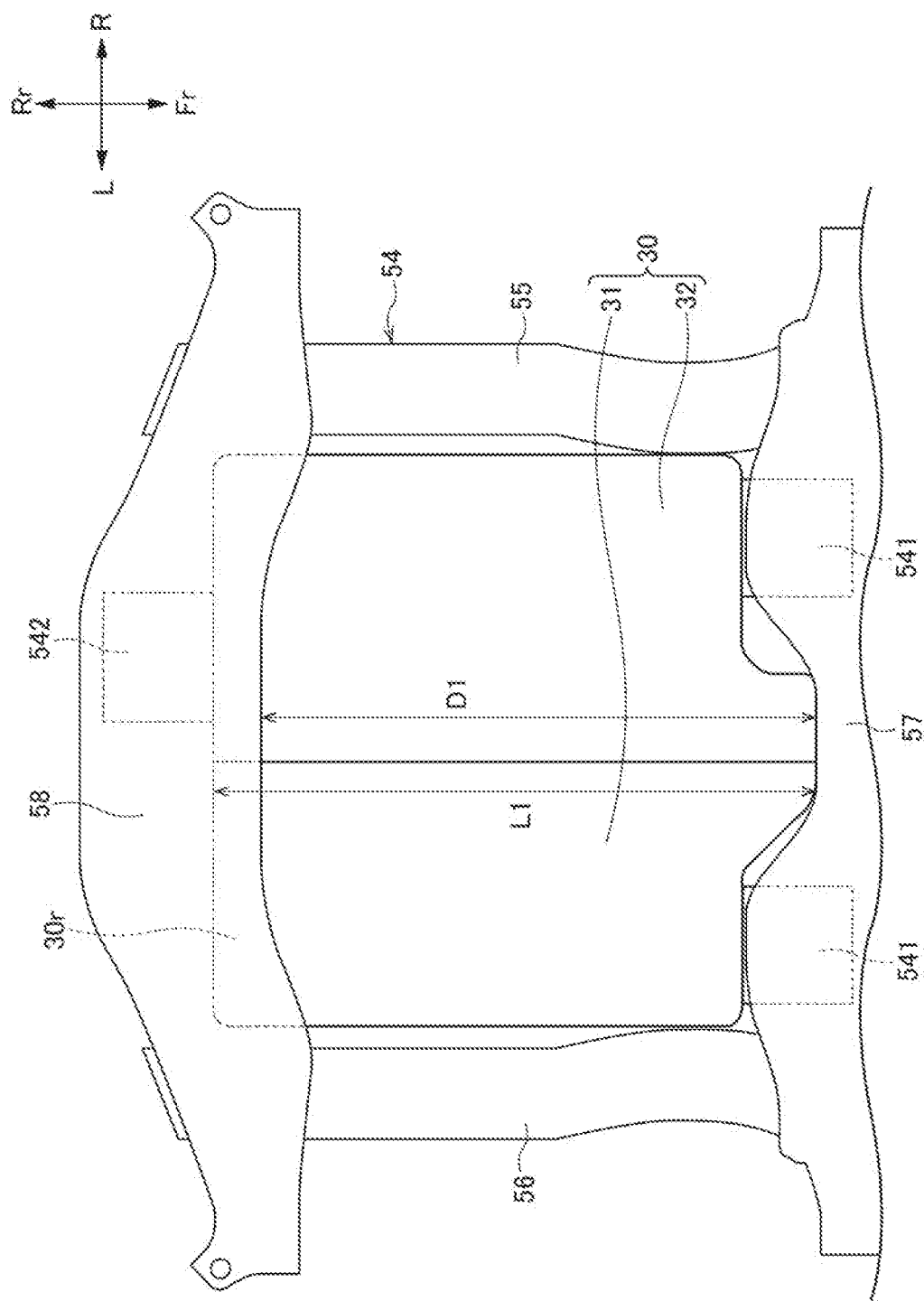
[FIG. 5]

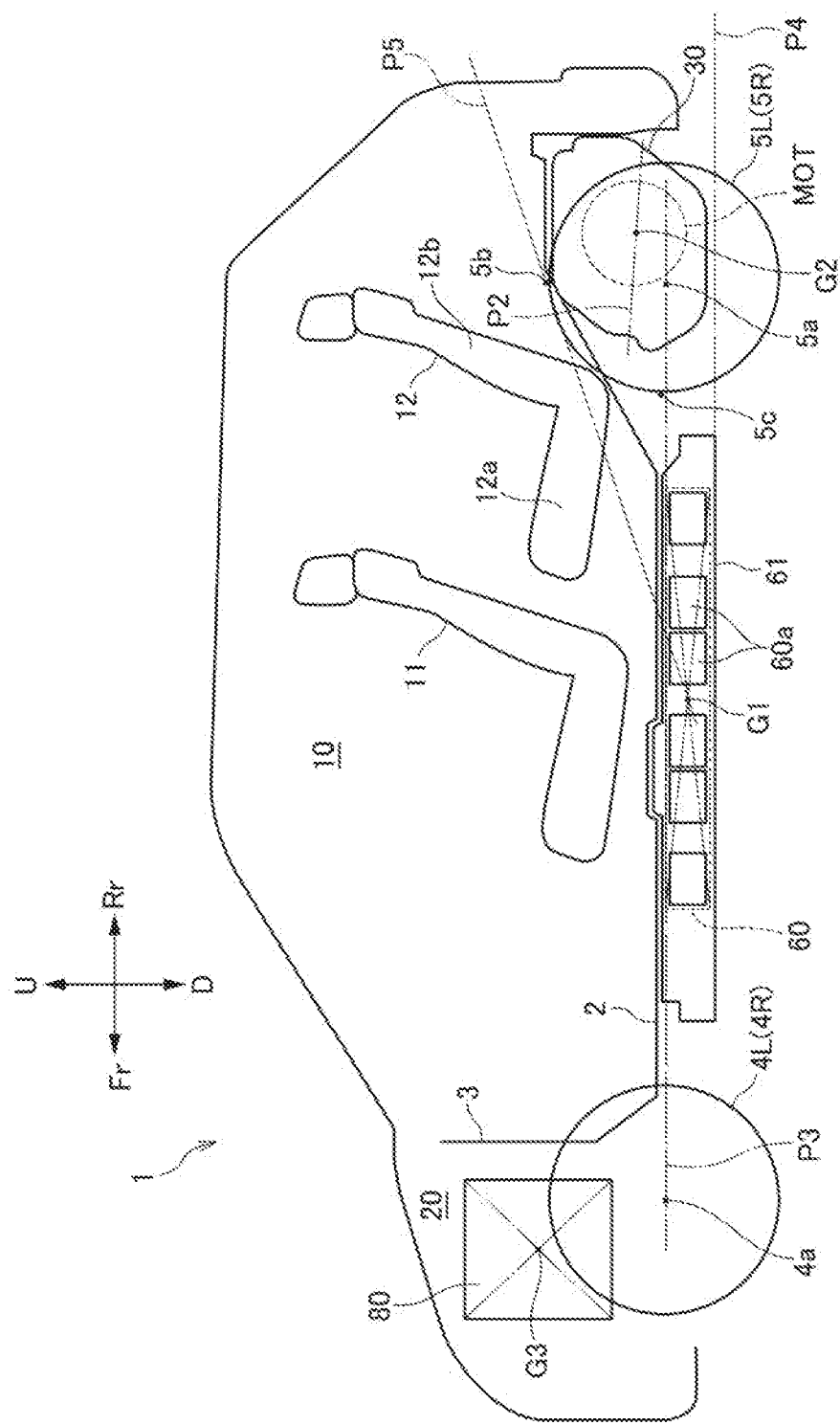
[FIG. 6]

VEHICLE HAVING IMPROVED TRANSMISSION OF TORQUE AND SUPPRESSION OF ROTATION OF DRIVING DEVICE UNIT

CROSS-REFERENCE TO RELATED APPLICATIONS

This application is based on and claims priority under 35 USC 119 from Japanese Patent Application No. 2018-170798 filed on Sep. 12, 2018, the contents of which are incorporated herein by reference.

TECHNICAL FIELD

The present invention relates to a vehicle including a battery and a driving device unit that receives electric power from the battery and drives rear wheels.

BACKGROUND ART

WO2012/017935 describes a hybrid vehicle in which a battery is disposed below a vehicle interior with a floor panel therebetween, and a front wheel driving device unit and a rear wheel driving device unit are provided with the battery therebetween.

As described in WO2012/017935, in the vehicle having the battery which is a heavy object mounted below the vehicle interior, a center of gravity can be lowered and a vehicle behavior is stabilized.

In vehicles mounted with a battery below such a vehicle interior, since the center of gravity of the battery is positioned near a center of the vehicle in a front-rear direction, there is room for improvement in efficiently transmitting a torque of the driving device unit to an axle.

Meanwhile, even in the event of a vehicle collision, it is necessary to regulate the rotation of the driving device unit in order to protect the battery which is a high-power device.

The present invention provides a vehicle capable of efficiently transmitting a torque of a driving device unit to an axle, and capable of suppressing the rotation of the driving device unit at the time of a collision.

SUMMARY OF INVENTION

A vehicle includes: a vehicle interior; a battery provided below the vehicle interior with a floor panel therebetween; and a driving device unit supported by a vehicle frame member via a front mounting portion and a rear mounting portion and configured to receive electric power from the battery to drive a left rear wheel and a right rear wheel. A center of gravity of the battery is positioned forward compared to a rear wheel axle that connects the left rear wheel with the right rear wheel, a center of gravity of the driving device unit is positioned rearward compared to the rear wheel axle, the front mounting portion is positioned forward compared to the rear wheel axle, the rear mounting portion is positioned rearward compared to the rear wheel axle, the front mounting portion is positioned above the rear mounting portion, and a first imaginary line and a second imaginary line pass above the rear wheel axle and below wheel upper end portions of the left rear wheel and the right rear wheel in a side view, the first imaginary line being a line connecting the center of gravity of the battery with the center of gravity of the driving device unit, the second imaginary line being a line connecting the front mounting portion with the rear mounting portion.

A vehicle includes: a vehicle interior; a battery provided below the vehicle interior with a floor panel therebetween; and a driving device unit supported by a vehicle frame member via a front mounting portion and a rear mounting portion and configured to receive electric power from the battery to drive rear wheels. A center of gravity of the battery is positioned forward compared to a rear wheel axle, the front mounting portion is positioned forward compared to the rear wheel axle, the rear mounting portion is positioned rearward compared to the rear wheel axle, the front mounting portion is positioned above the rear mounting portion, the driving device unit is disposed between an imaginary line that extends a lower surface of the battery and a tangent of wheels of the rear wheels passing through the center of gravity of the battery in a side view, and a second imaginary line connecting the front mounting portion with the rear mounting portion passes above the rear wheel axle and below wheel upper end portions of the rear wheels in the side view.

According to the first and second aspects, by increasing a load pressing the rear wheels, relative displacement of the rear wheel axle with respect to the driving device unit in an upper-lower direction is suppressed, and a torque transmission to the rear wheel axle can be stabilized. Further, acceleration performance can be improved by increasing the load pressing the rear wheels.

Furthermore, the front mounting portion is higher than the rear mounting portion in the upper-lower direction, so that it is possible to suppress the rotation of the driving device unit in a rear-end collision.

BRIEF DESCRIPTION OF DRAWINGS

FIG. 1 is a schematic side view showing an overall structure of a vehicle according to an embodiment of the present invention;

FIG. 2 is a plan view showing an underfloor structure of the vehicle of FIG. 1;

FIG. 3 is a plan view of a driving device unit of the vehicle in FIG. 1 and a periphery thereof;

FIG. 4 is a left side view of the driving device unit of the vehicle in FIG. 1 and a periphery thereof;

FIG. 5 is a bottom view of the driving device unit of the vehicle in FIG. 1 and the periphery thereof; and FIG. 6 is a schematic side view showing an overall structure of a vehicle according to a modification of the present invention.

DESCRIPTION OF EMBODIMENTS

Hereinafter, a vehicle according to an embodiment of the present invention will be described with reference to the drawings. Incidentally, the drawings should be seen based on a direction of reference numerals. In the following description, front, rear, left, right, upper, and lower directions are described according a view from an operator. In the drawings, a front side of the vehicle is denoted by Fr, a rear side is denoted by Rr, a left side is denoted by L, a right side is denoted by R, an upper side is denoted by U, and a lower side is denoted by D.

Overall Structure of Vehicle

As shown in FIGS. 1 and 2, a vehicle 1 according to an embodiment of the present invention is formed by a vehicle interior 10 and a front room 20 in front of the vehicle interior 10, which are defined by a floor panel 2 and a dash panel 3.

Front seats 11 and rear seats 12 are provided in the vehicle interior 10. A driving device unit 30 is provided below the floor panel 2 behind the rear seat 12. The driving device unit 30 drives a left rear wheel 5L and a right rear wheel 5R. That is, in the vehicle 1, the left rear wheel 5L and the right rear wheel 5R are driving wheels, and a left front wheel 4L and a right front wheel 4R are driven wheels. The front wheels 4L, 4R and the rear wheels 5L, 5R are supported by a vehicle body frame 50 via suspensions (not shown) supported by respective suspension support portions 6.

A vehicle body frame 50 includes a pair of left and right side members 51, 52 extending in a front-rear direction, a plurality of cross members 53 extending in a left-right direction and connecting the side members 51, 52, and a subframe 54 having a rectangular shape so as to surround the driving device unit 30. The subframe 54 includes a pair of sub-side members 55, 56 supported by the pair of side members 51, 52, and a front frame member 57 and a rear frame member 58 that connect the pair of sub-side members 55, 56.

Battery

A battery 60 including a plurality of battery modules 60a is disposed below the vehicle interior 10. The battery 60 is accommodated in a battery case 61 and disposed below the floor panel 2. A center of gravity G1 of the battery 60 is positioned rearward compared to a front wheel axle 4a connecting the left front wheel 4L with right front wheel 4R, and is positioned forward compared to a rear wheel axle 5a connecting the left rear wheel 5L with the right rear wheel 5R. In other words, the center of gravity G1 of the battery 60 is positioned substantially at a center of the vehicle 1 in the front-rear direction.

Driving Device Unit

As shown in FIGS. 3 and 4, the driving device unit 30 is fixed to a rear frame member 58 via a rear mounting portion 542, and is fixed to a front frame member 57 via a pair of front mounting portions 541. The driving device unit 30 includes a driving device 31 that accommodates a motor MOT as an electric motor and a Power Control Unit (PCU) 32 as an electric motor control unit that controls the motor MOT. The driving device 31 is provided with a transmission (not shown), and torque of the motor MOT is transmitted to a rear wheel axle 5a via the transmission, and is transmitted from the rear wheel axle 5a to the rear wheels 5L, 5R. The driving device 31 and the PCU 32 are arranged side by side in a width direction of the vehicle 1 in a top view.

A maximum length L1 of the driving device unit 30 in the front-rear direction is longer than a maximum distance D1 between the front frame member 57 and the rear frame member 58 of the subframe 54 in the front-rear direction, and as shown in FIG. 5, a rear end portion 30r of the driving device unit 30 overlaps the rear frame member 58 in a bottom view. Since the maximum length L1 of the driving device unit 30 in the front-rear direction is longer than the maximum distance D1 between the front frame member 57 and the rear frame member 58 of the subframe 54 in the front-rear direction, a length of the subframe 54 in the front-rear direction supporting the driving device unit 30 can be reduced. Further, since the rear end portion 30r of the driving device unit 30 overlaps the rear frame member 58, the rear frame member 58 of the subframe 54 can firmly bear a rear load of the driving device unit 30. Incidentally, the maximum length L1 of the driving device unit 30 in the front-rear direction is a length which does not include brackets of the front mounting portions 541 and the rear mounting portion 542.

As shown in FIG. 4, the front mounting portions 541 are positioned in front of the rear wheel axle 5a, and the rear mount portion 542 is positioned behind the rear wheel axle 5a. The front mounting portions 541 are positioned upward than the rear mounting portion 542.

A center of gravity G2 of the driving device unit 30 is positioned behind the rear wheel axle 5a. Although a rotational axis of the motor MOT is defined as the center of gravity G2 of the driving device unit 30 in FIGS. 1 and 4, the center of gravity G2 of the driving device unit 30 may deviate from the rotational axis of the motor MOT in practice.

Here, as shown in FIG. 1, when a line connecting the center of gravity G1 of the battery 60 with the center of gravity G2 of the driving device unit 30 is defined as a first imaginary line P1, the first imaginary line P1 passes above the rear wheel axle 5a and below wheel upper end portions 5b of the rear wheels 5L, 5R in a side view. As shown in FIGS. 1 and 4, when a line connecting the front mounting portion 541 (a support center point of the front mounting portion 541) with the rear mounting portion 542 (a support center point of the rear mounting portion 542) is defined as a second imaginary line P2, the second imaginary line P2 passes above the rear wheel axle 5a and below the wheel upper end portions 5b of the rear wheels 5L, 5R in the side view. That is, in the side view, the first imaginary line P1 and the second imaginary line P2 pass above the rear wheel axle 5a and below the wheel upper end portions 5b of the rear wheels 5L, 5R. Each of the wheel upper end portions 5b of the rear wheels 5L, 5R may be an upper end portion of a wheel on which a tire is mounted, or may be an upper end portion of the tire.

Since the first imaginary line P1 and the second imaginary line P2 pass above the rear wheel axle 5a and below the wheel upper end portions 5b of the rear wheels 5L, 5R, a load pressing the rear wheels 5L, 5R increases. Accordingly, relative displacement of the rear wheel axle 5a with respect to the driving device unit 30 in an upper-lower direction is suppressed, and a torque transmission to the rear wheel axle 5a can be stabilized.

Further, since the center of gravity G2 of the driving device unit 30 is positioned behind the rear wheel axle 5a, when receiving a reaction force of the torque at the time of forward movement, a downward force is applied to the rear mounting portion 542 and acts in a direction in which the rear wheels 5L, 5R are pressed. Accordingly, an acceleration performance of the vehicle 1 can be improved. Further, even during regenerative deceleration in which a load is applied to sides of the front wheels 4L, 4R, deterioration of regeneration efficiency can be suppressed by suppressing lifting of the rear wheels 5L, 5R.

Further, since the front mounting portions 541 are higher than the rear mounting portion 542 in the upper-lower direction, the first imaginary line P1 intersects the second imaginary line P2. When the first imaginary line P1 is inclined upward toward the rear, the driving device unit 30 attempts to rotate counterclockwise with respect to the battery 60 at the time of a rear collision, but when the second imaginary line P2 is inclined upward toward the front, the driving device unit 30 attempts to rotate clockwise with respect to the subframe 54 in the rear-end collision. In this way, the intersection of the first imaginary line P1 and the second imaginary line P2 cancels the force for rotating the driving device unit 30, so that it is possible to suppress the rotation of the driving device unit 30 in the rear-end collision.

The center of gravity G2 of the driving device unit 30 is positioned on the second imaginary line P2. Accordingly, the driving device unit 30 can be held in a well-balanced manner by the front mounting portions 541 and the rear mounting portion 542.

Further, as shown in FIGS. 2 and 3, a distance D2 between a left rear suspension support portion 6 (hereinafter also referred to as left rear suspension support portion 6LR) and a right-rear suspension support portion 6 (hereinafter, also referred to as right rear suspension support portion 6RR) in the vehicle width direction is shorter than a length L2 of the battery case 61 accommodating the battery 60 in the vehicle width direction and is shorter than a length L3 of the battery 60 in the vehicle width direction. Accordingly, the load of the battery 60 can be securely applied to the left and right suspensions. The length L3 of the battery 60 in the vehicle width direction is a length between a left end portion and a right end portion of an arrangement region of battery modules 60a.

Electrical Device Unit

Returning to FIG. 1, an electrical device unit 80 is provided in the front room 20. The electrical device unit 80 includes a junction box, a charger, a DC-DC converter, and the like, and these electrical devices are accommodated in the front room 20 in a state of being held by an auxiliary frame (not shown).

As shown in FIG. 1 in the side view, the center of gravity G3 of the electrical device unit 80 and the center of gravity G2 of the driving device unit 30 are positioned above a third imaginary line P3 connecting the front wheel axle 4a with the rear wheel axle 5a. The center of gravity G3 of the electrical device unit 80 is positioned above the center of gravity G2 of the driving device unit 30 and the center of gravity G1 of the battery 60. In addition to the lowering of the center of gravity by disposing the battery 60 under the floor, by inclining a roll shaft slightly rearward, relative displacement between an occupant and a vehicle body at the time of steering can be suppressed to enable natural turning. Further, a load can be securely applied to the rear wheels 5L, 5R at the time of acceleration.

A seating surface 12a of each rear seat 12 is between the center of gravity G1 of the battery 60 and the rear wheel axle 5a in the front-rear direction of the vehicle 1, and is positioned above the third imaginary line P3 connecting the front wheel axle 4a with the rear wheel axle 5a. A seat back 12b of the rear seat 12 is positioned between wheel front end portions 5c of the rear wheels 5L, 5R and the rear wheel axle 5a. Accordingly, it possible to reliably apply the weight of an occupant on the rear seat 12 to the rear wheels 5L, 5R at the time of acceleration.

The above embodiments may be appropriately modified, improved, or the like. FIG. 6 shows a vehicle 1 according to a modification.

In a vehicle 1 according to a modification, the driving device unit 30 is disposed between a fourth imaginary line P4 that extends a lower surface 60d of the battery 60 and a tangent P5 of the wheels of the rear wheels 5L, 5R passing through the center of gravity G1 of the battery 60 in the side view, the second imaginary line P2 connecting the front mounting portion 541 with the rear mounting portion 542 passes above the rear wheel axle 5a and below the wheel upper end portions 5b of the rear wheels in the side view.

In the vehicle 1 according to the modification, since the driving device unit 30 is disposed between the fourth imaginary line P4 that extends the lower surface 60d of the battery 60 and the tangent P5 of the rear wheels 5L, 5R passing through the center of gravity G1 of the battery 60, and the second imaginary line passes above the rear wheel axle 5a and below the wheel upper end portions 5b of the rear wheels 5L, 5R, the load pressing the rear wheels 5L, 5R increases. Accordingly, relative displacement of the rear wheel axle 5a with respect to the driving device unit 30 in the upper-lower direction is suppressed, and the torque transmission to the rear wheel axle 5a can be stabilized.

Further, since the center of gravity G2 of the driving device unit 30 is positioned behind the rear wheel axle 5a, when receiving a reaction force of the torque at the time of forward movement, a downward force is applied to the rear mounting portion 542 and acts in a direction in which the rear wheels 5L, 5R are pressed. Accordingly, the acceleration performance of the vehicle 1 can be improved. Further, even during regenerative deceleration in which a load is applied to sides of the front wheels 4L, 4R, deterioration of regeneration efficiency can be suppressed by suppressing lifting of the rear wheels 5L, 5R.

Further, in a rear-end collision, the driving device unit 30 attempts to rotate counterclockwise with respect to the battery 60, but since the front mounting portions 541 are higher in the vertical direction than the rear mounting portion 542, and the second imaginary line P2 is inclined upward toward the front, the driving device unit 30 attempts to rotate clockwise with respect to the subframe 54. In this way, since the force for rotating the driving device unit 30 is offset, it is possible to suppress the rotation of the driving device unit 30 in the rear-end collision.

At least the following matters are described in this specification. Corresponding components in the above-described embodiments are shown in parentheses, without being limited thereto.

(1) A vehicle (vehicle 1) includes:
a vehicle interior (vehicle interior 10);
a battery (battery 60) provided below the vehicle interior with a floor panel (floor panel 2) therebetween; and
a driving device unit (driving device unit 30) supported by a vehicle frame member (subframe 54) via front mounting portions (front mounting portions 541) and a rear mounting portion (rear mounting portion 542) and configured to receive electric power from the battery to drive a left rear wheel (left rear wheel 5L) and a right rear wheel (right rear wheel 5R), wherein
a center of gravity (center of gravity G1) of the battery is positioned forward compared to a rear wheel axle (rear wheel axle 5a) that connects the left rear wheel with the right rear wheel,
a center of gravity (center of gravity G2) of the driving device unit is positioned rearward compared to the rear wheel axle,
the front mounting portion is positioned forward compared to the rear wheel axle,
the rear mounting portion is positioned rearward compared to the rear wheel axle,
the front mounting portion is positioned above the rear mounting portion,
a first imaginary line (first imaginary line P1) and a second imaginary line (second imaginary line P2) pass above the rear wheel axle and below wheel upper end portions (wheel upper end portions 5b) of the left rear wheel and the right rear wheel in a side view, the first imaginary line being a line connecting the center of gravity of the battery with the center of gravity of the driving device unit, the second imaginary line being a line connecting the front mounting portion with the rear mounting portion.

According to (1), since the first imaginary line connecting the center of gravity of the battery with the center of gravity of the driving device unit and the second imaginary line connecting the front mounting portion with the rear mounting portion pass above the rear wheel axle and below the wheel upper end portions of the rear wheels, a load pressing the rear wheels increases. Accordingly, relative displacement of the rear wheel axle with respect to the driving device unit in an upper-lower direction is suppressed, and torque transmission to the rear wheel axle can be stabilized.

Further, since the center of gravity of the driving device unit is positioned behind the rear wheel axle, when receiving a reaction force of a driving force at the time of forward movement, a downward force is applied to the rear mounting portion and acts in a direction in which the rear wheels are pressed. Accordingly, the acceleration performance of the vehicle can be improved.

Further, even during regenerative deceleration in which a load is applied to side of the front wheels, deterioration of regeneration efficiency can be suppressed by suppressing lifting of the rear wheels.

Furthermore, since the first imaginary line intersects the second imaginary line when the front mounting portions are higher than the rear mounting portion in the upper-lower direction, it is possible to suppress the rotation of the driving device unit at the time of a rear-end collision.

(2) In the vehicle according to (1),
the center of gravity of the driving device unit is positioned on the second imaginary line.

According to (2), the driving device unit can be held in a well-balanced manner by the front mounting portions and the rear mounting portion.

(3) In the vehicle according to (1) or (2),
the vehicle frame member is a subframe (subframe 54) having a rectangular shape so as to surround the driving device unit, and
a maximum length (maximum length L1) of the driving device unit in a front-rear direction is longer than a maximum distance (maximum distance D1) between a front frame member (front frame member 57) and a rear frame member (rear frame member 58) of the subframe in a front-rear direction.

According to (3), the length of the subframe in the front-rear direction that supports the driving device unit can be reduced.

(4) In the vehicle according to (3),
a rear end portion (a rear end portion 30r) of the driving device unit overlaps the rear frame member in the front-rear direction.

According to (4), the rear frame member of the subframe can firmly bear a rear load of the driving device unit.

(5) in the vehicle according to any one of (1) to (4),
the vehicle includes:
a left rear suspension support portion (left rear suspension support portion 6LR) to which a left rear suspension supporting the left rear wheel is fixed; and
a right rear suspension support portion (right rear suspension support portion 6RR) to which a right rear suspension supporting the right rear wheel is fixed,
wherein a distance (distance D2) between the left rear suspension support portion and the right rear suspension support portion in a vehicle width direction is shorter than a length (length L2) of a battery case accommodating the battery in the vehicle width direction.

According to (5), the load of the battery can be securely applied to the left and right suspensions.

(6) In the vehicle according to any one of (1) to (5),
the vehicle includes:
a left rear suspension support portion (left rear suspension support portion 6LR) to which a eft rear suspension supporting the left rear wheel is fixed; and
a right rear suspension support portion (right rear suspension support portion 6RR) to which a right rear suspension supporting the right rear wheel is fixed,
wherein a distance (distance D2) between the left rear suspension support portion and the right rear suspension support portion in a vehicle width direction is shorter than a length (length L3) of the battery in the vehicle width direction.

According to (6), the load of the battery can be securely applied to the left rear suspension and the right rear suspension.

(7) In the vehicle according to any one of (1) to (6),
the front wheels are driven wheels.

According to (7), complication of a driving force transmission path of the driving device unit can be avoided.

(8) In the vehicle according to (7),
the vehicle includes:
a front room (front room 20) provided in front of the vehicle interior; and
an electrical device unit (electrical device unit 80) provided in the front room, wherein
a center of gravity (center of gravity G3) of the electrical device unit and the center of gravity of the driving device unit are positioned above a third imaginary line (third imaginary line P3) connecting the front wheel axle with the rear wheel axle, and
the center of gravity of the electrical device unit is positioned above the center of gravity of the driving device unit and the center of gravity of the battery.

According to (8), in addition to the lowering of the center of gravity by disposing the battery under the floor, by inclining a roll shaft slightly rearward, relative displacement between an occupant and a vehicle body at the time of steering can be suppressed to enable natural turning. Further, the load can be securely applied to the rear wheels at the time of acceleration.

(9) In the vehicle according to (7) or (8),
a seating surface (seating surface 12a) of a rear seat (rear seat 12) is between the center of gravity of the battery and the rear wheel axle and is positioned above a third imaginary line (third imaginary line P3) connecting the front wheel axle with the rear wheel axle, and
a seat back (seat back 12b) of the rear seat is positioned between wheel front end portions (wheel front end portions 5c) of the left rear wheel and the right rear wheel in the front-rear direction of the vehicle and the rear wheel axle.

According to (9), it possible to reliably apply the weight of an occupant on the rear seat to the rear wheels at the time of acceleration.

(10) A vehicle (vehicle 1) includes:
a vehicle interior (vehicle interior 10); and
a battery (battery 60) provided below the vehicle interior with a floor panel (floor panel 2) therebetween; and
a driving device unit (driving device unit 30) supported by a vehicle frame member (subframe 54) via front mounting portions (front mounting portions 541) and a rear mounting portion (rear mounting portion 542) and configured to receive electric power from the battery to drive rear wheels (rear wheels 5L, 5R), wherein a center of gravity (center of gravity G1) of the battery is positioned forward compared to a rear wheel axle (rear wheel axle 5a), the front mounting portion is positioned forward compared to the rear wheel axle, the rear mounting portion is positioned rearward compared to the rear wheel axle, the front mounting portion is positioned above the rear mounting portion, the driving device unit is disposed between a fourth imaginary line (fourth imaginary line P4) that extends a lower surface (lower surface 60d) of the battery and a tangent (tangent P5) of wheels of the rear wheels passing through the center of gravity of the battery in a side view, and a second imaginary line (second imaginary line P2) connecting the front mounting portion with the rear mounting portion passes above the rear wheel axle and below wheel upper end portions (wheel upper end portions 5b) of the rear wheels in the side view.

According to (10), since the driving device unit is disposed between the imaginary line that extends the lower surface of the battery and the tangent of the rear wheels passing through the center of gravity of the battery, and the second imaginary line connecting the front mounting portion with the rear mounting portion passes above the rear wheel axle and below the wheel upper end portions of the rear wheels in the side view, a load pressing the rear wheels increases. Accordingly, relative displacement of the rear wheel axle with respect to the driving device unit in an upper-lower direction is suppressed, and torque transmission to the rear wheel axle can be stabilized. Further, acceleration performance can be improved by increasing the load pressing the rear wheels.

Furthermore, the front mounting portion is higher than the rear mounting portion in the upper-lower direction, so that it is possible to suppress the rotation of the driving device unit at the time of a rear-end collision.

What is claimed is:

1. A vehicle comprising:
   a vehicle interior;
   a battery provided below the vehicle interior with a floor panel therebetween; and
   a driving device unit supported by a vehicle frame member via a front mounting portion and a rear mounting portion and configured to receive electric power from the battery to drive a left rear wheel and a right rear wheel, wherein
   a center of gravity of the battery is positioned forward compared to a rear wheel axle that connects the left rear wheel with the right rear wheel,
   a center of gravity of the driving device unit is positioned rearward compared to the rear wheel axle,
   the front mounting portion is positioned forward compared to the rear wheel axle,
   the rear mounting portion is positioned rearward compared to the rear wheel axle,
   the front mounting portion is positioned above the rear mounting portion,
   the front mounting portion is positioned above the center of gravity of the driving device unit, and the rear mounting portion is positioned below the center of gravity of the driving device unit, and
   a first imaginary line and a second imaginary line pass above the rear wheel axle and below wheel upper end portions of the left rear wheel and the right rear wheel in a side view when viewed from a vehicle width direction, the first imaginary line being a line in the side view that connects the center of gravity of the battery with the center of gravity of the driving device unit, and the second imaginary line being a line in the side view that connects a support center point of the front mounting portion with a support center point of the rear mounting portion.

2. The vehicle according to claim 1,
   wherein the center of gravity of the driving device unit is positioned on the second imaginary line in the side view.

3. The vehicle according to claim 1, wherein
   the vehicle frame member is a subframe having a rectangular shape so as to surround the driving device unit, and
   a maximum length of the driving device unit in a front-rear direction is longer than a maximum distance between a front frame member and a rear frame member of the subframe in the front-rear direction.

4. The vehicle according to claim 3,
   wherein a rear end portion of the driving device unit overlaps the rear frame member in a bottom view.

5. The vehicle according to claim 1, further comprising:
   a left rear suspension support portion to which a left rear suspension supporting the left rear wheel is fixed; and
   a right rear suspension support portion to which a right rear suspension supporting the right rear wheel is fixed,
   wherein a distance between the left rear suspension support portion and the right rear suspension support portion in the vehicle width direction is smaller than a length of a battery case accommodating the battery in the vehicle width direction.

6. The vehicle according to claim 1, further comprising:
   a left rear suspension support portion to which a left rear suspension supporting the left rear wheel is fixed; and
   a right rear suspension support portion to which a right rear suspension supporting the right rear wheel is fixed,
   wherein a distance between the left rear suspension support portion and the right rear suspension support portion in the vehicle width direction is smaller than a length of the battery in the vehicle width direction.

7. The vehicle according to claim 1,
   wherein front wheels are driven wheels, and
   the left rear wheel and the right rear wheel are driving wheels.

8. The vehicle according to claim 7, further comprising:
   a front room provided in front of the vehicle interior; and
   an electrical device unit provided in the front room, wherein
   a center of gravity of the electrical device unit and the center of gravity of the driving device unit are positioned above a third imaginary line connecting the front wheel axle with the rear wheel axle, and
   the center of gravity of the electrical device unit is positioned above the center of gravity of the driving device unit and the center of gravity of the battery.

9. The vehicle according to claim 7, wherein
   a seating surface of a rear seat is between the center of gravity of the battery and the rear wheel axle and is positioned above a third imaginary line connecting the front wheel axle with the rear wheel axle, and
   a seat back of the rear seat is positioned between wheel front end portions of the left rear wheel and the right rear wheel in a front-rear direction of the vehicle and the rear wheel axle.

10. The vehicle according to claim 1, wherein
the vehicle comprises a plurality of front mounting portions, and
the plurality of front mounting portions, the rear mounting portion, and the center of gravity of the driving device unit are all located on a same plane.

11. A vehicle comprising:

a vehicle interior;

a battery provided below the vehicle interior with a floor panel therebetween; and a driving device unit supported by a vehicle frame member via a front mounting portion and a rear mounting portion and configured to receive electric power from the battery to drive rear wheels, wherein a center of gravity of the battery is positioned forward compared to a rear wheel axle, the front mounting portion is positioned forward compared to the rear wheel axle, the rear mounting portion is positioned rearward compared to the rear wheel axle, the front mounting portion is positioned above the rear mounting portion, the front mounting portion is positioned above a center of gravity of the driving device unit, and the rear mounting portion is positioned below the center of gravity of the driving device unit, the driving device unit is disposed between a first imaginary line that extends a lower surface of the battery and a tangent of wheels of the rear wheels passing through the center of gravity of the battery in a side view when viewed from a vehicle width direction, and in the side view, a second imaginary line connecting a support center point of the front mounting portion with a support center point of the rear mounting portion passes above the rear wheel axle and below wheel upper end portions of the rear wheels in the side view.

12. The vehicle according to claim 11,
wherein the center of gravity of the driving device unit is positioned on the second imaginary line in the side view.

13. The vehicle according to claim 11, wherein
the vehicle comprises a plurality of front mounting portions, and
the plurality of front mounting portions, the rear mounting portion, and the center of gravity of the driving device unit are all located on a same plane.

* * * * *